(12) United States Patent
Petrov et al.

(10) Patent No.: US 12,116,212 B2
(45) Date of Patent: Oct. 15, 2024

(54) CONVEYOR SYSTEM, MOTOR ROLLER CONTROLLER AND METHOD FOR OPERATING A CONVEYOR SYSTEM

(71) Applicants: Dimitar Ivanov Petrov, Sofia (BG); Nikola Aleksandrov Yankov, Sofia (BG); Dimitar Hristov Suvandzhiev, Sofia (BG); Ivan Dimitrov Petrov, Sofia (BG); Kazuya Ichieda, Miki (JP); Randy Combs, Burlington, KY (US); Georg Malina, Düsseldorf (DE)

(72) Inventors: Dimitar Ivanov Petrov, Sofia (BG); Nikola Aleksandrov Yankov, Sofia (BG); Dimitar Hristov Suvandzhiev, Sofia (BG); Ivan Dimitrov Petrov, Sofia (BG); Kazuya Ichieda, Miki (JP); Randy Combs, Burlington, KY (US); Georg Malina, Düsseldorf (DE)

(73) Assignees: KYOWA EUROPE GMBH, Leichlingen (DE); INDUSTRIAL SOFTWARE, Sofia (BG)

( * ) Notice: Subject to any disclaimer, the term of this patent is extended or adjusted under 35 U.S.C. 154(b) by 0 days.

(21) Appl. No.: 18/485,686

(22) Filed: Oct. 12, 2023

(65) Prior Publication Data
US 2024/0043223 A1 Feb. 8, 2024

Related U.S. Application Data

(63) Continuation of application No. PCT/EP2022/057417, filed on Mar. 22, 2022.

(30) Foreign Application Priority Data

Apr. 20, 2021 (EP) .................................. 21169396

(51) Int. Cl.
*B65G 43/00* (2006.01)
*B65G 13/02* (2006.01)
(Continued)

(52) U.S. Cl.
CPC ............. *B65G 43/00* (2013.01); *B65G 13/02* (2013.01); *B65G 13/04* (2013.01); *B65G 13/06* (2013.01); *B65G 39/12* (2013.01); *G05B 19/4189* (2013.01)

(58) Field of Classification Search
CPC ........ B65G 43/00; B65G 13/02; B65G 13/04; B65G 13/06; B65G 39/12; G05B 19/4189; G05B 2219/31162; G05B 2219/31257
See application file for complete search history.

(56) References Cited

U.S. PATENT DOCUMENTS 8,381,901 B2 * 2/2013 Yamamoto ............. B65G 23/08
198/791
8,789,686 B2 * 7/2014 Lindemann ............ B65G 13/06
198/788
(Continued)

FOREIGN PATENT DOCUMENTS

CA 3144735 A1 2/2021
CN 105023409 A 11/2015
(Continued)

*Primary Examiner* — Thomas Randazzo
(74) *Attorney, Agent, or Firm* — Reinhart Boerner Van Deuren P.C.

(57) ABSTRACT

Conveyor system, for instance for conveying goods, packages and the like including at least two wired motor-roller controllers, wherein each wired motor-roller controller has at least one motor-roller control port and at least one wired signal bus port, at least two wireless motor-roller controllers, wherein each wireless motor-roller controller has at least on motor-roller control port and a wireless port, and wherein the two wired motor-roller controllers are connected in (Continued)

series along the signal bus via the signal bus port, wherein at each wired motor-roller controller senses a signal strength of wireless signals of the wireless motor-roller controllers, and the wired motor-roller controllers exchange information about the sensed signal strengths.

16 Claims, 4 Drawing Sheets

(51) Int. Cl.
    *B65G 13/04*     (2006.01)
    *B65G 13/06*     (2006.01)
    *B65G 39/12*     (2006.01)
    *G05B 19/418*     (2006.01)

(56) References Cited

U.S. PATENT DOCUMENTS

| | | | |
|---|---|---|---|
| 9,022,208 B2* | 5/2015 | Huber | B64D 9/00 198/781.05 |
| 2002/0010527 A1 | 1/2002 | Wielebski et al. | |
| 2008/0308389 A1* | 12/2008 | Inoue | B65G 13/06 198/788 |
| 2012/0046784 A1* | 2/2012 | Malina | G05B 19/4189 700/230 |
| 2012/0290126 A1* | 11/2012 | Combs | B65G 43/00 198/781.01 |
| 2014/0277698 A1* | 9/2014 | Combs | G05B 19/4189 198/460.1 |
| 2017/0363708 A1 | 12/2017 | Thillainadarajah et al. | |
| 2023/0391556 A1* | 12/2023 | Petrov | B65G 43/00 |

FOREIGN PATENT DOCUMENTS

| | | |
|---|---|---|
| CN | 110077793 A | 8/2019 |
| DE | 102010037601 A1 | 4/2011 |
| EP | 3540547 A1 | 9/2019 |
| JP | 2011096011 A | 5/2011 |
| WO | WO 2015009467 A1 | 1/2015 |

* cited by examiner

CONVEYOR SYSTEM, MOTOR ROLLER CONTROLLER AND METHOD FOR OPERATING A CONVEYOR SYSTEM

CROSS-REFERENCE TO RELATED PATENT APPLICATIONS

This patent application is a continuation of International Application No. PCT/EP2022/057417, filed on Mar. 22, 2022, which claims the benefit of priority to European Patent Application No. 21169396.5, filed Apr. 20, 2021, the entire teachings and disclosures of both applications are incorporated herein by reference thereto.

BACKGROUND OF THE INVENTION

The subject matter relates to a conveyor system, for instance for conveying goods, packages and the like. In particular the subject matter relates to conveyor systems with motor-driven conveyors driven by motor rollers. The subject matter further relates to a motor roller controller within such a conveyor system and a method for operating such a conveyor system.

SUMMARY OF THE INVENTION

Motor-driven conveyor-rollers, a.k.a. motor rollers, comprise a roller body rotatable mounted about a roller axis. The roller body usually is a hollow tube. Within the roller body the motor is arranged. The motor is an electric motor which is configured to generate a rotational movement about the roller axis between an axle element and the roller body.

For the sake of understanding, in the following the term motor roller can be used for the motor within the roller body alone, a drive unit comprising the motor and a corresponding control circuit for the motor within the roller body or the roller body comprising the motor or the drive unit. In the following the term motor can be used for the motor as such as well as the drive unit comprising the motor as such and a corresponding control circuit for the motor.

It is well known that motor-rollers are operated by a control unit, also known as controller, being arranged external, outside the roller body. The controller exchanges control signals with the motor inside the roller body.

Motor-driven conveyors driven by motor-rollers of this type are used in conveyor systems. In such conveyor systems, a single motor rollers is used to operate several roller bodies within a conveyor zone. Conveyor systems oftentimes have several conveyor zones through which an object to be conveyed passes one after the other. As has been said, within each conveyor zone, at least one motor-driven conveyor-roller operates several rollers.

A controller has a wired power inlet for receiving electric power, preferably dc-power. Moreover, the controller has a wired motor roller port. The wired motor roller port is configured to provide the motor roller with drive power. The motor can be fed through the motor roller port using for instance a PWM-signal to control at least the rotational speed of the motor. In addition, status information and control signals can be exchanged between the motor roller and the controller using the motor roller port. Status information and/or control signals can, inter alia, include current motor speed, set motor speed, current conveyor speed, set conveyor speed, current rotational direction, set rotational direction, current/set operation mode, temperature, error messages, gear ratio of the motor gear, serial number, article number, production date etc. In particular, the motor roller port is a four wired motor port in line with EP 3 100 340 B1.

A conventional wired controller comprises a wired I/O (Input/Output)-port. This I/O-port is configured to exchange control information with a central control center for instance a central SPS-control. The I/O-port can, for instance, be configured using a proprietary protocol. However, the I/O-port can also be configured using standardized I/O-protocols, for instance according to CAN, DeviceNet, Ethernet Powerlink, INTERBUS, Fieldbus, LIN, M-Bus, PROFIBUS, VARAN etc. In addition to such a conventional controller, a wireless controller is known, which operates similar to the wired controller. The explanation for the wired and the wireless controllers can be used for both, with the exception that the I/O Bus or the wireless controller is a wireless bus, with appropriate wireless protocols.

The controller is configured to exchange motor roller control signals with a motor roller at the motor roller port, to exchange motor roller status signals with the motor roller at the motor roller port and to exchange motor roller control signals for the motor roller with a central control at the I/O-port. Exchange of the relevant control and status signals are well known and need no further description. It should be noted that all of the ports an inlets of the wired controller are preferably wired ports, requiring wiring between the motor roller and the controller and be the controller and centralized control center. Wiring usually is necessary to provide stable communication in industrial environments. A wireless controller has also a wiring with the motor roller and the power inlet, however, a wireless I/O port.

For the sake of understanding the motor-roller controller, a.k.a. controller may be arranged for controlling motor rollers. As such, within the controllers, at least one microprocessor may be provided for operating the motor rollers within a conveyor system and more particular for operating at least one motor roller within a conveyor system.

Conveyor systems usually are constructed with several conveyor zones being spatially serial arranged. That is, one conveyor zone is followed by the next conveyor zone. Within each conveyor zone at least one, preferably only one motor roller is provided. Two spatially neighbouring motor rollers may also be operated by a single motor roller controller.

Every motor roller or at least every second is controlled by a separate motor roller controller. The motor roller controllers are connected to each other and with a central controller using a serial bus. The wiring of the motor roller controllers along the serial bus corresponds to the relative spatial arrangement of the motor rollers along the conveyor. In current system, the analogy between the wiring of the controllers on the one hand and the spatial arrangement of the respective motor rollers along the conveyor is important to reflect the topology of the motors along the conveyor within the wiring topology. That means that the wiring of the controllers is corresponding to the spatial arrangement of the motor rollers along the conveyor. However, wiring is labour intensive and error prone. Also, wiring the motor roller controllers requires a robust wired bus and in particular for safety reasons, the wiring may be done redundant.

Due to the costly, labour intensive and error prone wiring, there is a constant need to more easily set up a plurality of motor rollers along a conveyor with reduced wiring effort.

The subject matter is thus based on the objective technical problem of providing a conveyor system with a plurality of motor rollers being controlled by wired and wireless motor roller controllers and at the same time enabling failsafe setup of the topology of the motor roller controllers.

This object is solved according to the present disclosure.

A conveyor system is in particular arranged for conveying goods, packages and the like along a conveying line. A conveying line may be comprised of at least two conveying zones, each of which is actuated using one motor roller. For the sake of understanding, the term conveyor or conveyor line can be understood as synonyms. The conveying zone is comprised of one motor roller and at least two, preferably six for more passive rollers. A motor roller and a passive roller is comprised of a preferably cylindrical tube being rotatably connected to a rack. By actuating the motor roller, the passive rollers are also actuated and rotated in a desired direction.

In order to operate a motor roller, a motor roller controller is required. The motor roller controller is arranged for empowering the motor roller and moreover for controlling the action of the motor roller, in particular for controlling start/stop, direction, torque, number of revolution/RPM. Moreover, the motor roller controller can be arranged for sensing motor roller status. Empowering the motor roller and/or sensing motor roller status may be accomplished using the motor roller port of the motor roller controller. The motor roller is wired to the motor roller controller. Thus, the motor roller control port of the motor roller controller is a wired port. In order to operate a plurality of motor roller controllers, the motor roller controllers are in turn connected to a control bus. Conventional systems are comprised of a plurality of motor roller controllers each of which being connected to a wired control bus.

For the sake of maintenance and programming the conveyor system, in current systems the wiring of the motor roller controllers along the signal bus reflects the spatial arrangement of the motor rollers along the conveyor line. This means, that consecutive motor roller controllers along the signal bus are connected to consecutive motor rollers along the conveyor line. This means that the topology of the wiring of the motor roller controllers reflects the topology of the arrangement of the motor rollers along a conveyor line.

However, according to the subject matter, it is proposed to not only use wired motor roller controllers but in addition at least two wireless motor roller controllers. The wireless motor roller controllers operate similar to the wired motor roller controllers and the description of these may be applied to the wireless motor roller controllers as well. The sole difference between a wired and a wireless motor roller controller may be the connection to a central controller. While the wired motor roller controllers are connected to the wired signal bus, the wireless motor roller controlled use a wireless communication protocol. Thus, instead of having a wired signal bus port, aka I/O port, the wireless motor roller controllers have a wireless port, aka wireless signal bus port or wireless I/O port.

Due to the use of wireless controllers along the conveyor line, it is not possible to reflect the topology of the motor rollers along the conveyor within the wiring of the wired motor roller controllers anymore. This gives rise to problems in maintaining and programming the topology, in particular in reflecting the topology of the motor rollers along the conveyor line. Within a mixed approach of wired and wireless motor roller controllers, the wiring topology of the wired motor roller controllers does not anymore reflect the topology of the motor rollers along the conveyor line.

In order to enable automatic topology detection, the subject matter now proposes that the wired motor roller controllers are used to compute the spatial position of the wireless motor roller controllers and thus the spatial position of the respective motor rollers operated by these.

It needs to be understood that both wireless and wired motor roller controllers are arranged along the conveyor line, in particular on the rack of the conveyor line, in close spatial proximity to the motor rollers they operate. Thus, the spatial position of the motor roller controllers usually corresponds to the spatial position of the motor rollers. As such, the relative positioning of the wired and/or wireless motor roller controllers to each other reflects the relative positioning of the motor rollers along the conveyor line.

In order to automatically compute the topology of the conveyor line, in particular in order to assign the wireless motor roller controllers a position along the conveyor line, it is proposed that each wired motor roller controller senses a signal strength of wireless signals of the wireless motor roller controllers.

Each wireless motor roller controller may send out continuously or intermittently a wireless signal. Also it may be possible that each wireless motor roller controller can be wirelessly polled, i.e. a polling signal, for instance send out by a wired motor roller controller, activates sending out the wireless signal by the wireless motor roller controller.

Since the spatial position of the wireless motor roller controllers relative to the wired motor roller controllers reflects the spatial position of the motor rollers along the conveyor line. The wireless motor roller controllers are arranged in a spatial distance to the respective wired motor roller controllers corresponding to the sensed signal strength within the respective wired motor roller controllers.

The subject matter uses this circumstance by sensing the signal strength of the wireless signal in the wired motor roller controllers. The signal strength of the wireless signal mainly corresponds to the spatial distance between a wired and a wireless motor roller controllers. Thus, the signal strength of the wireless signal may be used as an indication of the spatial distance between a wired motor roller controller and a wireless motor roller controller.

The wired motor roller controllers according to the subject matter exchange information about the signal strength. This exchange may be in between the wired motor roller controllers, in between the wireless motor roller controllers and a central controller or the like. The wired motor roller controllers may exchange this information via the wired signal bus. For the sake of clarity, the term "exchange" may comprise transfer, sending or receiving data.

The computing of the topology, as will be described hereinafter, may be carried out in each wired motor roller controllers, in at least one dedicated wired motor roller controller, such as master wired motor roller controller and/or a central controller. The description applies to any of these options.

It is preferred that spatially in between two wired motor roller controllers, at least two wireless motor roller controllers are arranged. Since the conveyor line is along a spatial trajectory, the spatial distance between a first wired motor roller controller and a respective one of the two wireless motor roller controllers is different than a spatial difference between a second wired motor roller controllers and the respective one of wireless motor roller controllers. This difference is reflected in the sensed signal strengths. By comparing the sensed signal strengths of the respective wireless motor roller controllers sensed in each of the wired motor roller controllers, it can be determined which wireless motor roller controller is closest to each of the two wired motor roller controllers. Thus, the spatial serial topology of the motor roller controllers and thus also the motor rollers can be computed from the sensed signal strengths.

Another possibility of a topology is, in terms of arrangement along a conveyor line, a first wireless motor roller controller followed by a wired motor roller controller followed by at least one second wireless motor roller controller, followed by a second wired motor roller controller followed by a third wireless motor roller controller.

The relative spatial distance between the first wireless motor roller controller and the first wired motor roller controller may be identical to the spatial distance between the first wired motor roller controller and one of the at least one second wireless motor roller controllers. The same may apply to one of the at least one second wireless motor roller controllers, the second wired motor roller controller and the third wireless motor roller controller. Moreover, the spatial distance between the two wired motor roller controllers and one of the at least one second wireless motor roller controllers may also be identical.

Nevertheless, sensing the signal strength of the wireless motor roller controllers in each of the two wired motor roller controllers may allow computing the topology. That is, the signal strength of the first and second wireless motor roller controller in the first wired motor roller controller may be identical. The signal strength of the third wireless motor roller controller sensed in the first wired motor roller controller may however be lower. Within the second wired motor roller controller, the sensed signal strength of the second and third wireless motor roller controllers may be identical. The signal strength of the first wireless motor roller controller sensed in the second wired motor roller controller may however be lower.

When comparing the received signal strength of the two wired motor roller controllers it can be determined that the first wireless motor roller controller is farther away from the second wired motor roller controller than from the first wired motor roller controller. It can also be determined that the third wireless motor roller controller is farther away from the first wired motor roller controller than from the first wired motor roller controller. Eventually, it may be determined that one of the at least one second motor roller controllers lies in between the first and second wired motor roller controllers. Thus, the topology computed may be:— first wireless motor roller controller, first wired motor roller controller, second wireless motor roller controller, second wired motor roller controller and third wireless motor roller controller. This topology can be automatically computed and can reflect the spatial arrangement of the actual motor roller controllers along the conveyor line, which in turn reflects the arrangement of the motor rollers along the conveyor line.

In case of two or more second wireless motor roller controllers in between the first and second wired motor roller controllers, the topology may also be computed.

That is, the signal strength of one second wireless motor roller controller in the first wired motor roller controller may be higher than the signal strength of one second wireless motor roller controller in the first wired motor roller controller. Thus, it may be computed, which of the two second wireless motor roller controllers is closer to the first wired motor roller controller. The same applies to the second wired motor roller controller. Thus, the relative distance between the wired motor roller controllers and the wireless motor roller controllers spatially arranged in between these can be obtained from the sensed signal strengths.

Thus, any kind of topology may be automatically computed based on the sensed signal strengths and the exchange of this information.

As has been explained above, it is proposed according to an embodiment that each wired motor roller controller is connected via the motor roller controller port to at least one motor roller along a conveyor. The motor rollers along the conveyor are arranged in respective conveying zones. Consecutive conveying zones establish a conveyor line. Within each conveyor zone there is one motor roller and at least two passive rollers. Via the motor roller port, the motor rollers can be activated, controlled and/or regulated as explained above.

Within a conveyor system, according to embodiments, it is proposed that the spatial serial topology of the wired motor roller controllers along the wired signal bus and the spatial serial topology of the motor rollers along the conveyor correspond to each other. As has been said above, the motor rollers are spatially arranged serially along the conveyor line. In correspondence thereto, the wired motor roller controllers are arranged serially along the signal bus. The positioning of the wireless motor roller controllers in between the wired motor roller controllers may be computed, according to embodiments, based on the sensed signal strength of the wireless signals.

According to embodiments, it is proposed that each wireless motor roller controller is connected via the motor roller control port to at least one motor roller along the conveyor. It may be preferred that a wireless motor roller controller is connected to two motor rollers. Nevertheless, in case of two motor rollers, these are connected in series along the conveyor line even in case they are connected to one single wireless motor roller controller. The same holds true for the wired motor roller controllers. Also the wired motor roller controllers can be connected to one or two motor rollers. In the latter case, the motor roller controllers connected to one wired motor roller controller are arranged in a consecutive order along the conveyor line.

According to embodiments, it is proposed that at least two motor rollers controlled by the respective wireless motor roller controller are arranged, along the serial topology of the conveyor, in between two motor rollers each controlled by a wired motor roller controller. That is, in between two wired motor roller controllers at least two wireless motor roller controllers are arranged. The corresponding motor rollers controlled by the wireless motor roller controllers are arranged in between the motor rollers controlled by the wired motor roller controllers along conveyor line. Thus, the topology of the wired and wireless motor roller controllers is such that the wired motor roller controller "embrace" the wireless motor roller controllers. As such, from a topology point of view, the wireless motor roller controllers are arranged in between the wired motor roller controllers. Their relative position in between the wired motor roller controllers can be computed based on the sensed signal strength as explained above.

According to embodiments, the wireless signal may be an identification signal. The wireless motor roller controller can send out this signal in particular via their wireless ports. However, also a separate wireless communication port may be used for sending out this signal used for computing the topology as explained.

As has been explained above, the wired motor rollers are controlled via the signal bus. The wireless motor roller controllers are controlled, according to embodiments, via a wireless communication protocol. As such, it is proposed that each wireless motor roller controller wirelessly receives motor roller commands via its wireless ports. The control commands can be similar to the control commands exchanged with the wired motor roller controllers. Control commands may, for instance, be current/set motor speed, current/set motor acceleration, current/set motor deceleration, current/set direction of rotation (clockwise/counterclockwise), motor type, ON/OFF switch for the P, PI or PID regulator, brake mode, run/stop the motor, type of inputs (NPN or PNP), manual/auto clear error, analog/digital control, set speed, NPN/PNP error, ON/OFF switch for the error output, NPN/PNP speed setting etc.

The identification signal of the wireless motor roller controllers may be unique. The identification signal may comprise a unique identification of a wireless motor roller controller. As such, it is possible to assign each received identification signal to a particular wireless motor roller controller using the unique identification. In order to compute the topology, it is proposed according to embodiments, that the wired motor roller controllers sense the unique identifier in the identification signal together with a signal strength of the identification signal. Thus, each received identification signal can be assigned to a unique wireless motor roller controller using the unique identification and within each wired motor roller controller the signal strength of each respective wireless motor roller controller is known.

For computing the topology, the signal strength of identification signals of respective wireless motor roller controllers sensed in at least two different wired motor roller controllers can be compared and thus the relative distance between the wireless motor roller controller and each of the wired motor roller controllers can be obtained. Thus, it is possible to compute, which wired motor roller controller is closer to a respective wireless motor roller controller based on the identification signal and the signals strength. The term computing may be understood as calculating, obtaining, deriving, processing or the like. Computing may be carried out in a microprocessor. The microprocessor may be arranged in at least one of the wired motor roller controllers or a component connected to the wired bus, e.g. a central processor.

The information relevant for computing the topology may be at least the information signal comprising the unique identification of the wireless motor roller together with its signal strength. In order to compute the topology, this information needs to be available from at least two wired motor roller controllers, which relative position to each other and/or which absolute position along the conveyor line is known. These motor roller controllers may assemble the information by sensing wireless signals comprising the unique identification and determining the signal strength of at least two wireless motor-roller controllers. Within a wired motor roller controller, (all) received/sensed wireless signals comprising unique identifications together with the corresponding signal strength can be stored in a memory. The memory can be arranged in an array, matrix and/or a list. The term list is used in the following as synonym for any of these.

Within at least one of the wired motor roller controllers or a component connected to the wired signal bus, lists of at least two distinct wired motor roller controllers may be stored. Having stored these lists, it is possible to compare sensed signal strengths of one particular wireless motor roller controller of which the wireless signal has been received in two or more distinct wired motor roller controllers. By comparing the received signal strengths it is possible, to determine the relative distance of the wireless motor roller controller to each of the wired motor roller controllers which received the identification signal. Thus, it is possible to determine to which one or to which two wired motor roller controllers the wireless motor roller controller is closest. With the knowledge of the absolute or relative position of the wired motor roller controllers, the respective wireless motor roller controller can be assigned a relative position thereto based on this information.

For the sake of understanding, the sensed signal strength may for instance be the field strength of the signal, a signal to noise ratio (SNR) of the signal, a bit error rate (BER) of the signal or the like. Moreover, the sensed signal strength can be an absolute value, an average value, a median value or the like. The signal strength may be sensed for a certain time and an average or a median value of the sensed signals can be computed.

The computing of the topology may, according to embodiments, comprise estimating a spatial distance between wireless motor roller controllers and wired motor roller controllers. The estimation may be based on the sensed signal strength. The higher the signal strength, the closer the wireless motor roller controller is located to the sensing wired motor roller controller. Thus, when comparing signal strengths of two wired motor roller controllers concerning the same wireless motor roller controller, it can be determined which wired motor roller controller is closer to the wireless motor roller controller based on the signal strength, i.e. the higher value relates to the closer proximity. Once an at least relative spatial distance between wireless motor roller controllers and wired motor roller controllers is estimated, the serial topology of the wireless motor roller controllers in relation to at least one wired motor roller controller can be computed.

According to embodiments, it is proposed that the relative spatial position of motor rollers to each other, connected to the motor roller control port of wireless motor roller controllers, corresponds to the relative spatial position of the wireless motor roller controllers to each other. Thus, the wiring of the motor rollers to the wireless motor roller controllers, i.e. the control ports thereof, is such that the motor rollers along the conveyor line are in the same consecutive order as the wireless motor roller controllers relative to each other.

According to embodiments, it is proposed that at least one of the wired motor roller controllers or a component connected to the wired signal bus computes a serial topology of the wireless motor roller controllers relative to the wired motor roller controllers. This computing may be based on the sensed signal strength and in particular on a comparison of sensed signal strengths of dedicated wireless motor roller controllers being listed in at least two lists to be compared. It may also be possible to compute a serial topology of the motor rollers connected to the wireless motor roller controllers along the conveyor, in particular relative to the motor rollers connected to the wired motor roller controllers.

In order to compare the sensed signal of one single wireless motor roller controller, stemming from two different wired motor roller controllers, it is proposed that the identification signal comprises an identification, e.g. serial number of the wireless motor roller controller. This serial number may for instance be unique, for instance a MAC-address.

Another aspect is a motor roller controller according to the present disclosure.

The motor roller controller has at least one wired signal bus port and at least one motor roller control port being operated as described above. In addition, there is comprised a wireless communication unit. The wireless communication unit within the motor roller controller is arranged to sense wireless signals, in particular identification signals of wireless motor roller controllers, as described above. The communication unit is further arranged to obtain signal strength information from the sensed identification signal.

The obtained signal strength may be an absolute value, an average value or a median value as described above. The wired communication unit can be arranged for sending and/or receiving signal strength information as described above. The signal strength information may be provided within a list together with the unique identification.

Within a motor roller controller there may be arranged a computing unit. The computing unit may be arranged to compute at least two lists of signal strength information, preferably together with the identification from at least two wired motor roller controllers. Each list may be dedicated to one wired motor roller controller by being identified with a unique identifier of a wired motor roller controller. Each entry in a list may comprise the sensed signal strength together with the identification of the wireless motor roller controller of which the signal strength has been sensed. When in two lists the same unique identification of wireless motor rollers is comprised, the corresponding signal strength can be compared and it can be computed, which of the wired motor roller controllers is closer to the wireless motor roller controller. Based on this information the topology may be computed. The computing as described above may be carried out for two or more wired motor roller controllers being in proximity to three, six or more wireless motor roller controllers.

According to an embodiment, it is proposed that the computing unit is arranged to compute a position of a wireless motor roller controller relative to at least two wired motor roller controllers based on the at least two lists. Thus, the topology of the conveyor line may be computed based on the knowledge of the position of the wired motor roller controllers relative to each other and the corresponding position of the wireless motor roller controllers relative to the wired motor roller controllers.

A further aspect is a method according to the present disclosure.

BRIEF DESCRIPTION OF THE DRAWINGS

These and other aspects of the subject matter will be explained more detail with reference to the following figure. In the figure show.

DETAILED DESCRIPTION

Figure 1A:
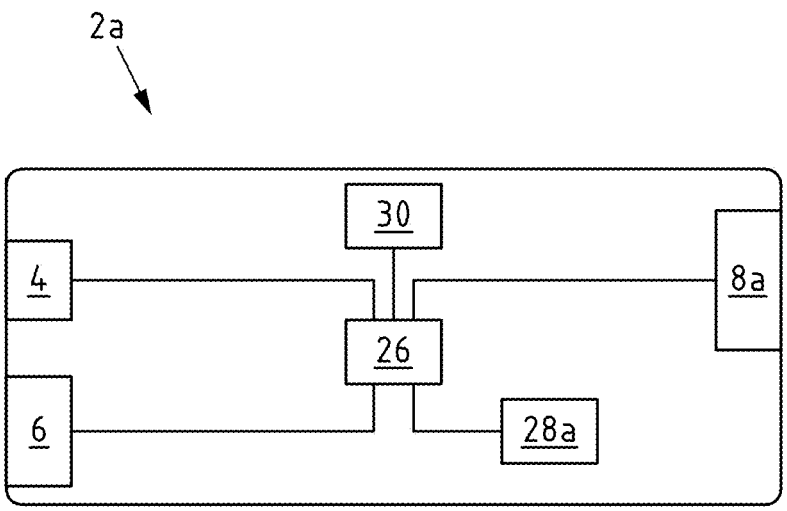
FIG. 1a is a wired motor-roller-controller according to embodiments.

FIG. 1a shows a conventional wired motor roller controller 2a for motor rollers. The controller 2 has a power inlet 4. The power inlet 4 preferably is a DC-power inlet 4, in particular 12V or 24V power inlet. Power inlet 4 receives the electric power for operating the controller 2. The Power inlet 4 may also receive the electric power for operation a motor roller.

A motor roller can be connected to a motor roller port 6. Motor roller port 6 has at least two, preferably four connectors for connecting the motor roller. Via the motor roller port 6 the motor-roller may at least be supplied with electrical energy. In addition, the motor-roller may be controlled by exchanging control signals and/or status information signals via the motor roller port 6. Control of motor rollers as such is well known and will not be described in more detail.

Eventually, controller 2 has a wired I/O-port 8a. I/O-port 8a can be a communication port for wired communication, for instance according to an industry standard, in particular as mentioned above. Moreover, I/O-port 8a can support any proprietary protocol. Via port 8a control signals and/or status information can be exchanged between the controller 2 and a central control center.

The controller 2 further has a central processor 26 which is connected to the power inlet 4, the motor roller port 6 and the I/O-port 8a. The central processor 26 can be programmed. The programming may be understood a setting parameters for the motor roller. According to the programming the motor roller is instructed via motor roller port 6 to at least rotate in a certain direction at a certain speed. Any other parameters as described above can be parameterized and programmed.

It is possible to set the parameters of controller 2 and read out status information from controller 2 via port 8a. In addition, controller 2 may have a memory 30.

During operation, central processor 26 outputs control signals for a motor roller via motor roller port 6. The signals output, the amperage as well as the voltage of the output signals and the like depend on configuration settings (parameters) of controller 2. Moreover, during operation, central processor 26 reads out status information from the motor roller via motor roller port 6.

In order to sense wireless signals via the air interface, as used for computing the topology as explained above and below, the controller 2a may also comprise a wireless unit 28a. The wireless unit 28a may be arranged to sense signals from wireless port 8b or wireless units 28b of wireless controllers 2b as explained below. The wireless unit 28a is arranged for sensing a signal strength of wireless signals. The signal strength may be a Signal/Noise Ratio (SNR), a field strength, a bit error rate (BER) or the like.

The wireless signal may be a signal send out by a controller 2b described below. The wireless signal may by pulsed or continuous. The wireless signal may comprise a unique identifier of the sending unit, i.e. the controller 2b. The wireless signal may comprise payload data for measurements purposes. The payload data may be any kind of symbols or data which has been agreed upon and with which the receiving controller 2a may carry out the measurement of the signal strength, SNR and/or BER or the like.

Figure 1B:
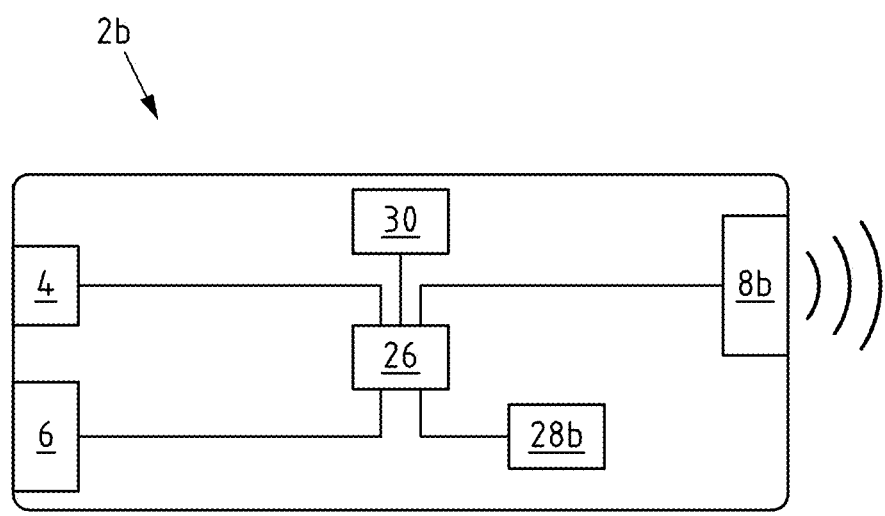
FIG. 1b is a wireless motor-roller-controller according to embodiments.

FIG. 1b shows a wireless motor roller controller 2b for motor rollers. The motor roller controller 2b corresponds to the motor roller controller 2a in regard to elements 4, 6, 26, 30. The function can be the same, however, different element with similar functionality may be used.

In contrast to controller 2a, the controller 2b may have a wireless port 8b. The functionality of the wireless port 8b may, in terms of sending and receiving control signals and information to and from a central processor similar to that of port 8a. In addition via port 8b, controller 2b may send out the wireless signal as described above.

Optionally or additionally, controller 2b may comprise a wireless unit 28b. The wireless unit 28b may be arranged to send out the wireless signal as described above.

Figure 2:
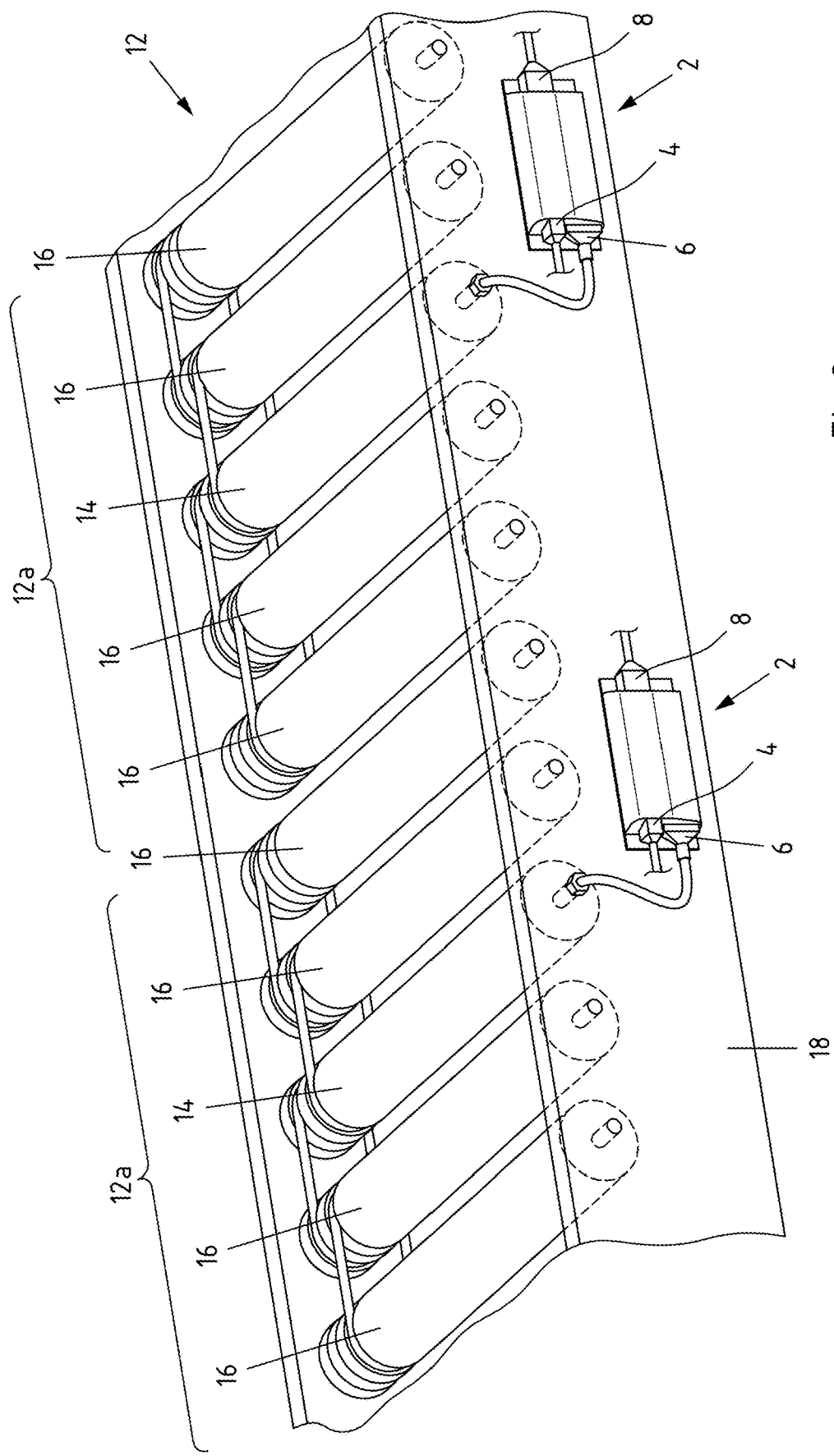
FIG. 2 is a conventional conveyor.

A conventional conveyor as illustrated in FIG. 2 may comprise motor rollers 14 and rollers 16. A conveyor line 12 may have two or more conveyor zones 12a. Within each conveyor zone 12a, one motor roller 14 is mechanically coupled with at least one, preferably between two to seven rollers 16, in particular by V-belts or poly-V-belts or the like. Other mechanical couplings are also possible.

A motor roller 14 is rotatable arranged on a rack 18 and comprises a motor within a hollow tube. The motor within the hollow tube is connected to the controller 2 via its motor roller port 6.

For each of these zones 12*a*, a separate controller 2 is provided controlling the respective motor-roller 14. The controllers 2 are connected to power and a control bus via their power inlets 4 and I/O-ports 8.

Figure 3:
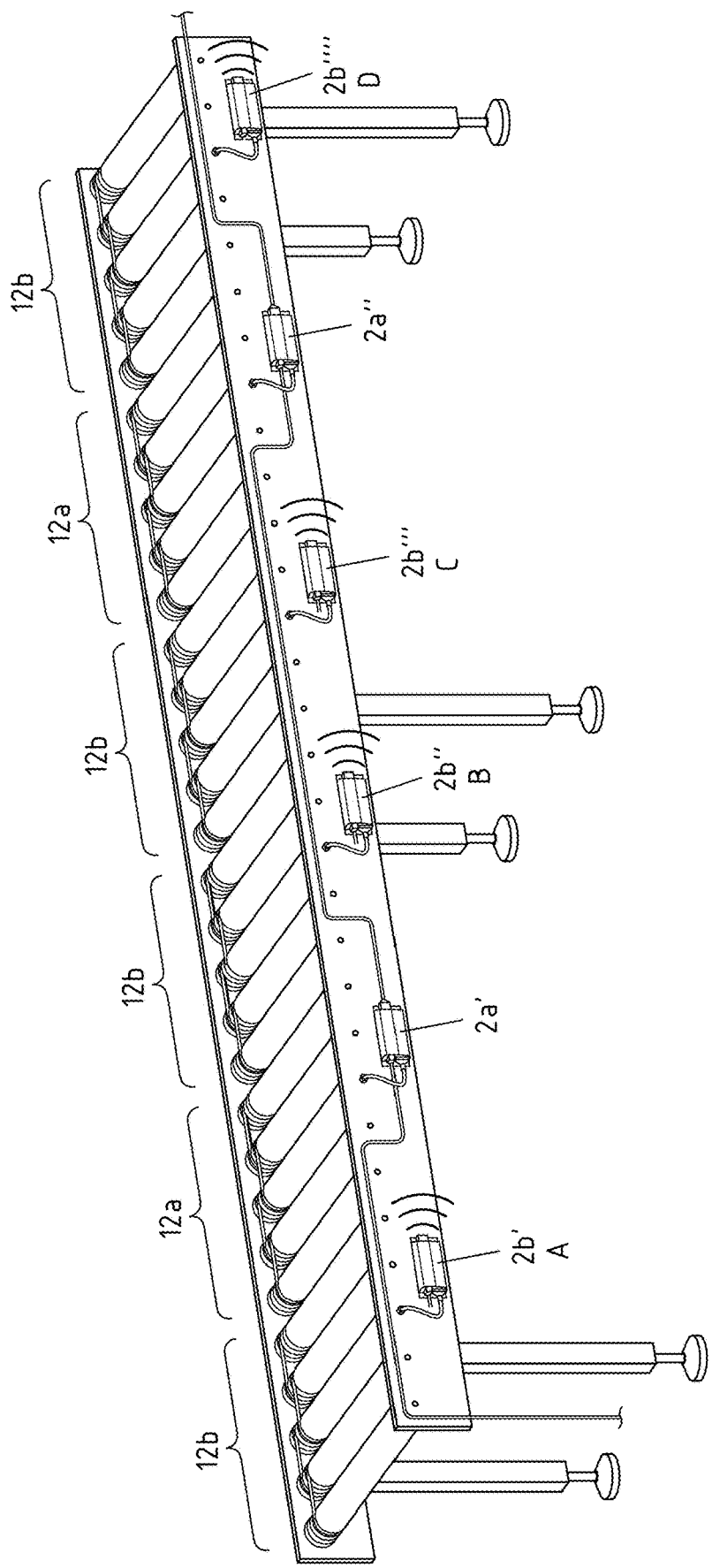
FIG. 3 is a conveyor according to embodiments.

A conveyor line 12 according to embodiments with a plurality of conveyor zones 12*a, b* is illustrated in FIG. 3.

In contrast to a conventional conveyor line 12, the conveyor according to embodiments has two different conveyor zones 12*a, b*. The conveyor zones 12*a* are operated by a wired motor-roller controller 2*a* and the conveyor zones 12*b* are operated by a wireless motor-roller controller 2*b*. For each conveyor zone 12*a* a single controller 2*a* is provided controlling a single motor roller 14. For each conveyor zone 12*b* a single controller 2*b* is provided controlling a single motor roller 14. It may also be the case that one motor-roller controller 2*a*/2*b* may control two spatially neighboring motor rollers 14.

As can be seen, the motor-roller controllers 12*a* are connected to each other by a wired signal bus. The connection of the motor rollers 12*a* is spatially in series and corresponds to the spatial arrangements of the conveyor zones 12*a* to each other. As can be seen in addition, between two motor-roller controllers 12*a*, there are arranged at least one, preferably two wireless motor-roller controllers 12*b*. In the following, an example with two wireless motor-roller controllers 12*b* between two wired motor-roller controllers 12*a* will be explained, however, the technical teaching is similar for one or more than two wireless motor-roller controllers 12*b* between two wired motor-roller controllers 12*a* and applies accordingly.

It can be understood from FIG. 3, that upon installing controllers 2*a* and connecting these to the wired bus, their topology may well be known from the wiring. However, it can also be seen that upon installing controllers 2*b*, their topology and spatial arrangement to each other and relative to the controllers 2*a* is unknown, since there is no wiring. In order to automatically determine the topology the following computing is proposed.

Each of the controllers 2*b* may be polled or may autonomously send out a wireless signal continuously or pulsed or intermitted or in certain intervals. The wireless signal may be as explained above. The controllers 2*b* send out the wireless signal via their wireless port 8*b* or via the wireless unit 28*b*. The air interface used for sending out the wireless signal may be implemented according to various standards, such as NFC, Bluetooth, WLAN, Zigbee or the like. As can been seen, the spatial distance between controllers 2*b* and 2*a* may be different. This spatial distance in particular the difference in spatial difference results in differences in sensed signal strengths of the respective controllers 2*b* in controllers 2*a*.

For the sake of description, controllers 2*a* are indexed with 2*a'*, 2*a"* and controllers 2*b* are indexed with 2*b'*-2*b""*. For instance, controller 2*b'* may send out a signal comprising a unique identifier A, controller 2*b"* may send out a wireless signal with identifier B, controller 2*b'''* may send out a signal with identifier C and controller 2*b""* may send out the wireless signal with identifier D.

In controller 2*a'*, for instance three wireless signals are sensed. Controller 2*a'* may thus maintain a list as will be shown in FIG. 4. Within the list of controller 2*a*, which list is identified with an identifier 2*a'*, for each unique identifier A, B, C, D, etc, if received, a signal strength value X, Y, Z is stored. This list identified by an identifier 2*a'* now comprises a plurality of entries, each entry being identified with an identifier A-D and a corresponding signal strength X, Y, Z.

Figure 4:
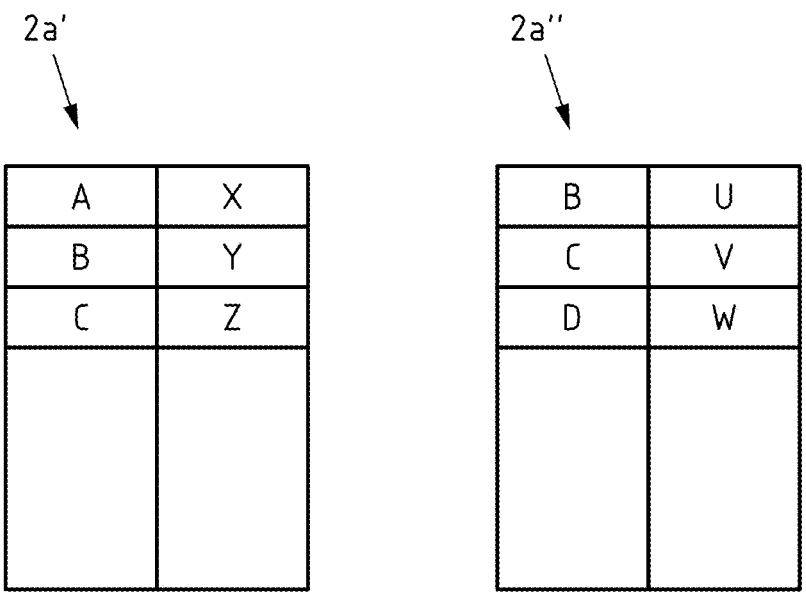
FIG. 4 is a list of information obtained by one wired motor-roller controller.

A similar list identified by an identifier 2*a'* is maintained in controller 2*a'*. As can be seen in FIG. 4 as well, lists 2*a"* contains the entries B, C and D with the corresponding signal strength values U, V, W. For the sake of understanding, it should be noted that the single strength values X, Y, Z, U, V, W in the different lists may have different or same values.

Controllers 2*a* maintain their corresponding lists as explained above and may exchange these with each other and/or a central controller being connected to the wired bus.

Figure 5:
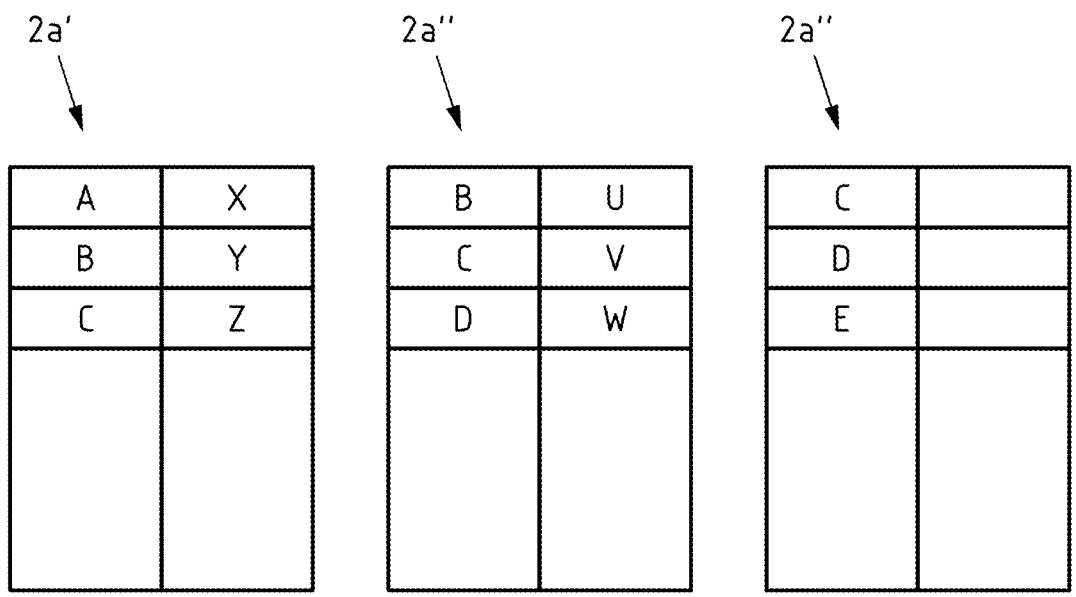
FIG. 5 is a set of lists for computing a topology according to embodiments.

In a computing unit, which may be part of processor 26 or a separate part or in a component anywhere along the wired bus, the lists of all controllers 2*a* along a serial branch of the wired bus may be received and computed. As is shown in FIG. 5, various lists 2*a'*, 2*a"* are received and stored. Using these lists, a comparison of field strength information may be carried out.

In the example, for instance, information about a field strength X for unique identifier A is only contained in list 2*a'*. This means, that controller 2*b'* is in close proximity to controller 2*a'* and cannot be in between controllers 2*a'* and 2*a"*, else within list 2*a"*, field strength signal for unique identifier A would be available. Thus, it can be concluded, that controller 2*b'* lies in terms of topology along the wired bus in front of controller 2*a'*.

The information on filed strength Y, Z for unique identifiers B, C can be compared with the information on field strength U, V for unique identifiers B, C. The example topology according to FIG. 3, it would result in that filed strength information Y has a value higher than field strength value U. This would result in concluding that along the wired signal bus, controller 2*b"* on the one hand lies in between controllers 2*a* and 2*a'* since unique identifier B is comprised in both lists 2*a'*, 2*a"* and on the other hand that controller 2*b"* lies closer to controller 2*a'* than to controller 2*a"*.

Moreover, in the example topology according to FIG. 3, the field strength value V for unique identifiers C would be higher than the field strength value Z for unique identifiers C. Since unique identifier C is comprised in both lists 2*a'*, 2*a"*, controller 2*b'''* lies in between controllers 2*a'* and 2*a"*. In addition, controller 2*b'''* is closer to controller 2*a'* than to controller 2*b'* and it can be concluded that it lies in terms of topology closer to controller 2*a"*.

This computing may be carried out for further lists 2*a"* and it may in each case be determined what the relative distance is between a controller 2*a* and a controller 2*b* and moreover, what the relative distance of a controller 2*b* to at least two of controllers 2*a* is. Based on that information, the topology in terms of spatial location of controllers 2*b* may be computed and thus also the topology of the conveyor zones 12*b* relative to the conveyor zones 12*a*.

It should be understood that the figures illustrate exemplary embodiments in detail, and it should be understood that the present application is not limited to the details or methodology set forth in the description or illustrated in the figures. It should also be understood that the terminology is for purpose of description only and should not be regarded as limiting.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A motor-roller controller comprising:
   at least one motor-roller control port and at least one wired signal bus port,
   a wireless communication unit arranged to sense identification signals of wireless motor-roller controllers and to obtain signal strength information from the sensed identification signals,
   a wired communication unit arranged to send the signal strength information and to receive signal strength information and
   a computing unit arranged to compute a position of the wireless motor-roller controller relative to at least two wired motor roller controllers based on the received signal strength information.

2. The motor-roller controller according to claim 1, wherein
   the computing unit is arranged to compute at least two lists of signal strength information from at least two wired motor roller controllers from the received signal strength information.

3. The motor-roller controller according to claim 2, wherein
   the computing unit is arranged to compute a position of a wireless motor-roller controller relative to the at least two wired motor roller controllers based on the at least two lists.

4. A conveyor system, for conveying goods and packages comprising:
   a motor-roller controller comprising:
      at least one motor-roller control port and at least one wired signal bus port,
      a wireless communication unit arranged to sense identification signals of wireless motor-roller controllers and to obtain signal strength information from the sensed identification signals,
      a wired communication unit arranged to send the signal strength information and to receive signal strength information and
      a computing unit arranged to compute a position of the wireless motor-roller controller relative to at least two wired motor roller controllers based on the received signal strength information;
   the at least two wired motor-roller controllers,
   at least two of the wireless motor-roller controllers, wherein each wireless motor-roller controller has at least one control port and a wireless port, and
   wherein the two wired motor-roller controllers are connected in series along a signal bus via the signal bus port,
   wherein
   each wired motor-roller controller senses a signal strength of wireless signals of the wireless motor-roller controllers, and
   the wired motor-roller controllers exchange information about the sensed signal strengths.

5. The conveyor system according to claim 4, wherein
   each wired motor-roller controller is connected via the motor-roller control port to at least one motor-roller along a conveyor and that
   the serial topology of the wired motor-roller controllers along the wired signal bus and the serial topology of the motor-rollers along the conveyor correspond to each other.

6. The conveyor system according to claim 4, wherein
   each wireless motor-roller controller is connected via the control port to at least one motor-roller along the conveyor.

7. The conveyor system according to claim 4, wherein
   at least two motor-rollers controlled by the respective wireless motor-roller controller are arranged, along the serial topology of the conveyor, in between two motor-rollers controlled by the respective wired motor-roller controllers.

8. The conveyor system according to claim 4, wherein
   each wireless motor roller controller wirelessly sends out an identification signal in particular via its wireless port.

9. The conveyor system according to claim 8, wherein
   the wired motor-roller controllers sense the identification signal together with a signal strength of the identification signal.

10. The conveyor system according to claim 4, wherein
    each wireless motor roller controller wirelessly receives motor roller commands via its wireless port.

11. The conveyor system according to claim 4, wherein
    at least one of the wired motor-roller controllers or a component connected to the wired signal bus stores a list of identifications of wireless motor-roller controllers and respective information about the sensed signal strengths.

12. The conveyor system according to claim 4, wherein
    based on the sensed signal strengths a spatial distance between wireless motor-roller controllers and wired motor-roller controllers is estimated and based on the estimated spatial distance a serial topology of the wireless motor-roller controllers in relation to at least one wired motor-roller controller is computed.

13. The conveyor system according to claim 4, wherein the relative spatial positions of motor-rollers connected to the control port of wireless motor-roller controllers corresponds to the relative spatial position of the wireless motor-roller controllers to each other.

14. The conveyor system according to claim 4, wherein at least one of the wired motor-roller controllers or a component connected to the wired signal bus computes a serial topology of the wireless motor-roller controller relative to the wired motor-roller controllers and/or a serial topology of the motor rollers connected to the wireless motor-roller controller along the conveyor relative to the motor rollers connected to the wired motor-roller controllers depending on the information about the sensed signal strength.

15. The conveyor system according to claim 4, wherein the identification signal comprises a serial number of the wireless motor-roller controller.

16. A method for operating a conveyor system comprising:
a motor-roller controller comprising:
at least one motor-roller control port and at least one wired signal bus port,
a wireless communication unit arranged to sense identification signals of wireless motor-roller controllers and to obtain signal strength information from the sensed identification signals,
a wired communication unit arranged to send the signal strength information and to receive signal strength information and
a computing unit arranged to compute a position of the wireless motor-roller controller relative to at least two wired motor roller controllers based on the received signal strength information;
the at least two wired motor-roller controllers,
at least two of the wireless motor-roller controllers, wherein each wireless motor-roller controller has at least one control port and a wireless port, and
wherein the wired motor-roller controllers are connected in series along a signal bus via the signal bus port, wherein
each of the wired motor-roller controller senses a signal strength of wireless signals of the wireless motor-roller controllers, and
the wired motor-roller controllers exchange information about the sensed signal strengths;
the method comprising:
sensing a signal strength of identification signals wirelessly send by at least two wireless motor-roller controllers, and
exchanging the information about the sensed signal strengths of the identification signals between at least two wired motor-roller controllers and
compute a position of a wireless motor-roller controller relative to at least two wired motor roller controllers based on the exchanged information.

* * * * *